United States Patent [19]

Smith

[11] 4,254,794
[45] Mar. 10, 1981

[54] VALVE FOR SELF-MAINTAINING POULTRY WATERER

[76] Inventor: Fred R. Smith, Fresh-Flow Systems, Inc., P. O. Box 265, Comer, Ga. 30629

[21] Appl. No.: 75

[22] Filed: Jan. 2, 1979

[51] Int. Cl.³ .......................... F16K 31/18; A01K 7/04
[52] U.S. Cl. ..................................... 137/434; 119/78; 137/448; 251/339
[58] Field of Search ............. 137/434, 445, 446, 448; 119/1, 78, 79, 80; 74/107; 222/509; 251/77, 82, 322, 339, 323, 251

[56] References Cited

U.S. PATENT DOCUMENTS

| | | | |
|---|---|---|---|
| 1,375,585 | 4/1921 | Goodwin et al. | 251/323 |
| 1,642,926 | 9/1927 | Imschweiler | 137/446 |
| 2,336,120 | 12/1943 | Null | 137/448 |
| 2,710,594 | 6/1955 | Thompson | 251/339 |
| 3,095,896 | 7/1963 | Ross | 137/448 |
| 3,128,745 | 4/1964 | Alter | 251/339 |
| 3,428,028 | 2/1969 | Hart | 119/75 |
| 3,646,955 | 3/1972 | Olde | 251/339 |
| 3,874,344 | 12/1973 | Smith | 119/78 |
| 3,941,094 | 3/1976 | Nilsen, Jr. | 119/80 |
| 4,014,365 | 3/1977 | Peterson et al. | 251/339 |
| 4,133,345 | 1/1979 | Mitchell | 251/339 |

*Primary Examiner*—Martin P. Schwadron
*Assistant Examiner*—G. L. Walton
*Attorney, Agent, or Firm*—George A. Smith, Jr.

[57] ABSTRACT

In a poultry watering system having a float-controlled valve for maintaining a desired water level in a trough, leakage through the valve from an overhead supply line, which may occur when the water supply is cut off is effectively prevented without reducing sensitivity of the float by the provision of spring means located within the interior of a valve housing and acting on the end of the float stem.

2 Claims, 7 Drawing Figures

VALVE FOR SELF-MAINTAINING POULTRY WATERER

BRIEF SUMMARY OF THE INVENTION

This invention relates to poultry watering systems and particularly to an improved float-controlled valve for maintaining a desired water level in an individual watering trough.

My U.S. Pat. No. 3,874,344, dated April 1, 1975 describes a self-maintaining poultry waterer designed particularly for use in supplying drinking water to debeaked chicks. This waterer comprises a relatively shallow dish or trough provided with a barrier wall extending upwardly from the bottom of the dish to divide it into two sections, one section being accessible to the chicks, and the other inaccessible. One or more passages are provided near the bottom of the barrier to permit water to flow from the inaccessible section to the other. Water is delivered through a conduit to a valve arranged to deliver water from the conduit to the inaccessible section. The valve is a float-controlled valve, and its purpose is to maintain a predetermined water level in the trough. The float-controlled valve comprises a housing having an inlet opening connected to receive water from the conduit, and a discharge opening arranged to discharge water into the inaccessible section of the trough, an internal valve seat surrounding the discharge opening on the upstream side thereof, and a valve pin extending through the discharge opening into the interior of the valve housing, and having an annular valve seal disposed at its end on the upstream side of the discharge opening. The valve seal is arranged to cooperate with the valve seat to close off the flow of water through the discharge opening, and a float, secured on the opposite end of the valve pin, is adapted to rest on the surface of the water in the inaccessible section of the trough. The float, the valve pin and the valve seal are so arranged, that at a predetermined water level in the trough, the valve seal is held against the valve seat by the pressure of water in the conduit, so that the flow of water into the trough is cut off. When the water level in the trough falls, the float falls with it, tilting the valve pin, and causing the valve seal to tilt. Water enters the trough through the discharge opening of the housing until the desired water level is reestablished, whereupon the valve pin is returned to the horizontal condition, closing off the discharge opening. The valve, therefore, operates automatically to maintain the desired water level in the trough.

One of the outstanding characteristics of the valve described in my patent is that, in practice, it can be made very small in size, and therefore very sensitive to small changes in the water level in the trough.

Another of the outstanding characteristics of the valve described in my patent resides in the fact that the movable assembly consisting of the float, the valve pin and the valve seal is neither hinged nor otherwise constrained against movement in a direction such that the float approaches the valve housing and the seal moves away from the seat. Consequently, the valve can be flushed to remove foreign materials from the location of the valve seat and valve seal by manually pushing the float toward the valve housing. This movement fully opens the valve, and permits a rapid flow of water through the discharge opening to clean the opening itself, and the valve pin, the valve seat and the valve seal as well. The freedom of movement of the float, valve pin and valve seal assembly also contributes to the sensitivity of the valve.

In a typical starter installation, a large number of watering troughs are supplied from an overhead water line through individual conduits leading downwardly from the water line to the respective troughs in the system. A single control valve is normally provided for shutting off the flow of water into the overhead line. Occasionally this control valve is closed, for example when maintenance is to be performed on a particular watering trough. The closure of the main control valve reduces the pressure acting to hold the valve seals against their corresponding seats so that the only pressure tending to hold the valves closed is that pressure corresponding to the height of the overhead line above the individual valves. With the pressure thus reduced, occasionally a valve seal will move away from its seat. When this happens, water drains from the conduit corresponding to the open valve, and from the overhead line, causing an overflow. Accordingly, while the use of an overhead supply line is desirable to facilitate cleaning of the starter house, it occasionally gives rise to an overflow problem.

In the past, in conjunction with float-controlled valves having the same general configuration as that described in my patent, attempts have been made to augment the line pressure in order to aid in maintaining proper seating pressure when the line pressure is low. For example, in U.S. Pat. No. 3,095,896, to A. J. Ross, dated July 2, 1963, a coil spring is provided between the float and the valve housing in order to insure seating of the valve when line pressure is reduced. While the use of a coil spring located between the float and the valve housing is applicable where relatively heavy components are used, the coil spring exerts small vertical forces on the float. In a very sensitive valve of the type described in my patent, these vertical forces would tend to interfere with the sensitivity of the valve, and may occasionally cause a failure of the valve seal to seat properly.

The principal object of the present invention is to provide a reliable float-controlled valve for use in a watering system having an overhead supply line, in which overflow conditions resulting from the shutting off of the main water supply are effectively prevented, and in which malfunctions resulting from reduced sensitivity of the float are prevented.

The foregoing object is achieved by incorporating, within the valve housing, spring means acting on the end of the valve pin within the housing, and continuously urging the valve seal in the direction toward the valve seat, so that water from the overhead line is prevented from entering the trough when the main water supply valve is closed off. The spring, being located within the housing, and acting on the end of the valve pin, has a negligible effect on the sensitivity of the float, but, at the same time, insures proper closure of the valve seal against the valve seat when the main water supply is cut off.

In the preferred form of the invention, the spring is in the form of a coil spring wound about a pin slidably guided within the housing for movement toward the end of the valve pin.

Various other objects and advantages of the invention will be apparent from the following detailed description, when read in conjunction with the drawings.

DETAILED DESCRIPTION

Figure 1:
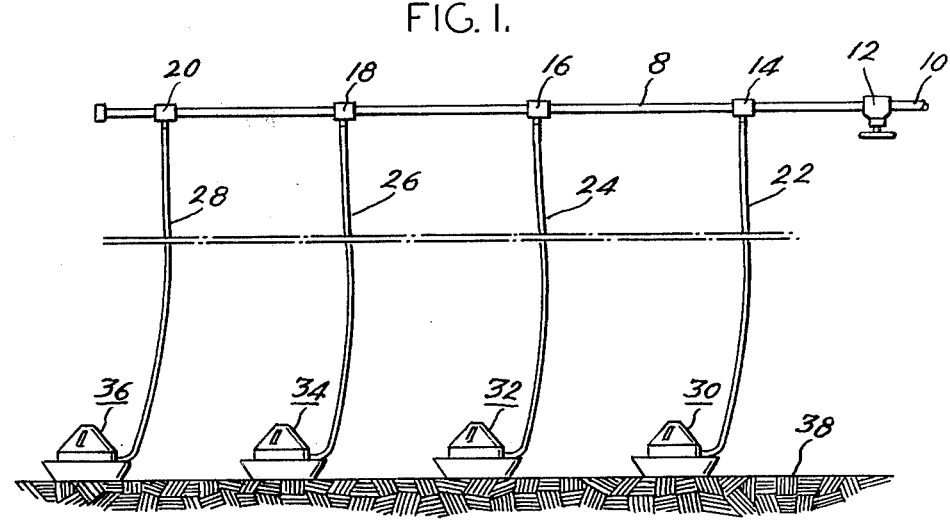
FIG. 1 is an elevational view of a typical poultry watering installation, showing a plurality of individual watering troughs supplied through vertically extending conduits from an overhead supply line.

In FIG. 1, an overhead water line 8 is supplied from water supply line 10 through a manually operable valve 12. Overhead line 8 is provided with a series of "T" connectors 14, 16, 18 and 20 which serve to deliver water from the overhead line through vertically extending flexible conduits 22, 24, 26 and 28 to individual watering troughs 30, 32, 34 and 36. Where baby chicks are being started, these troughs rest on the floor 38 of the starter house. These troughs, however, can be used to water larger birds, and provisions can be made for suspending them off the floor when they are so used.

Figure 2:
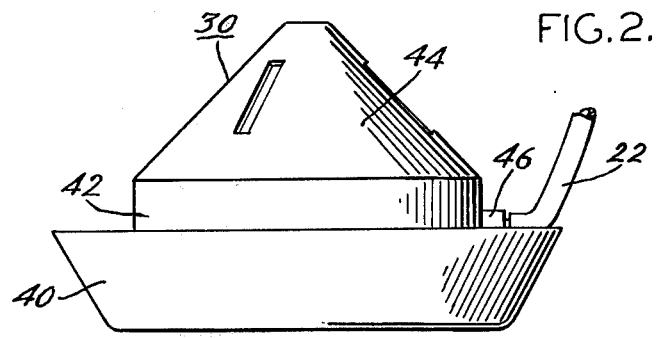
FIG. 2 is an elevational view of watering trough in accordance with the invention.

As shown in FIG. 2, an individual trough 30 comprises a dish 40, and a vertically extending barrier wall 42 extending upwardly from the bottom of the dish to provide an inaccessible interior chamber for housing the float. The interior chamber within barrier wall 42 is provided with a conical cover 44. Water from the overhead line is supplied through flexible conduit 22 to the interior chamber through a float-controlled valve assembly 46.

Figure 3:
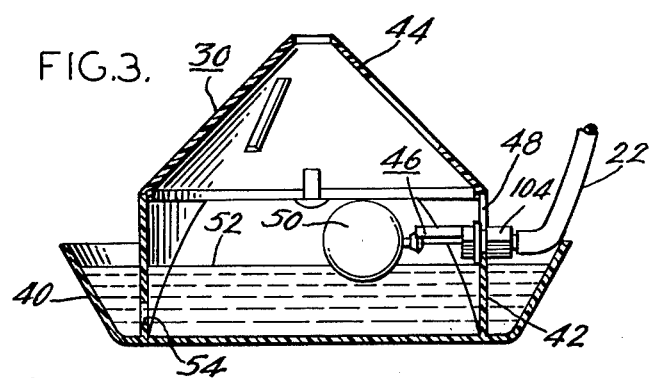
FIG. 3 is a vertical section of the watering trough.

As shown in FIG. 3, valve assembly 46 extends through wall 42, a slot being provided at 48. Opening and closing of the valve is controlled by the rise and fall of float 50, which rests on surface 52 of the water within wall 48. An opening 54 is provided near the bottom of the wall 48 to equalize the water levels in the accessible and inaccessible sections of dish 40.

In the operation of the device, as water is consumed by chicks drinking from the accessible portion of dish 40, surface 52 falls, and float 50 falls, opening the valve. Water flows through the valve into the inaccessible section of the dish and the water is restored to its predetermined level, whereupon the valve recloses.

Figure 4:
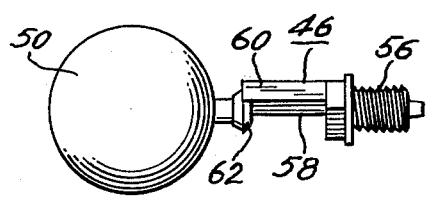
FIG. 4 is a side elevation of a valve in accordance with the invention.
Figure 5:
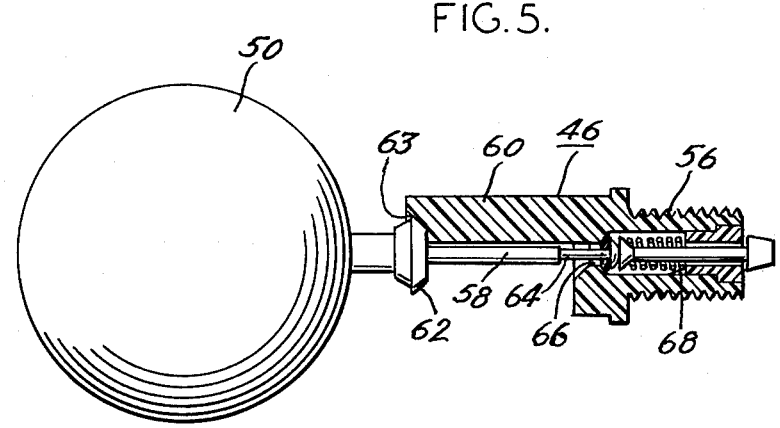
FIG. 5 is a vertical section taken through the valve in the longitudinal direction.

As shown in FIG. 4, valve assembly 46 comprises a housing 56 having a threaded cylindrical exterior, and a valve pin 58 extending from float 50 to the interior of the housing. An overhanging member 60 cooperates with a frusto-conical collar 62 to prevent valve stem 58 from tilting upwardly beyond the point at which the valve is closed, as such tilting would result in the eventual overflow of the trough. As shown in FIG. 5, overhanging member is provided at its end with a conical bevelled surface 63 conforming to the surface of collar 62. The cooperation of these two conical surfaces has the effect of tightening the valve if the float moves upward as a result of a minor leak in the valve. The cooperation of these surfaces also insures proper centering of the float as the valve closes, and prevents lateral swaying of the float when the valve is closed.

Figure 6:
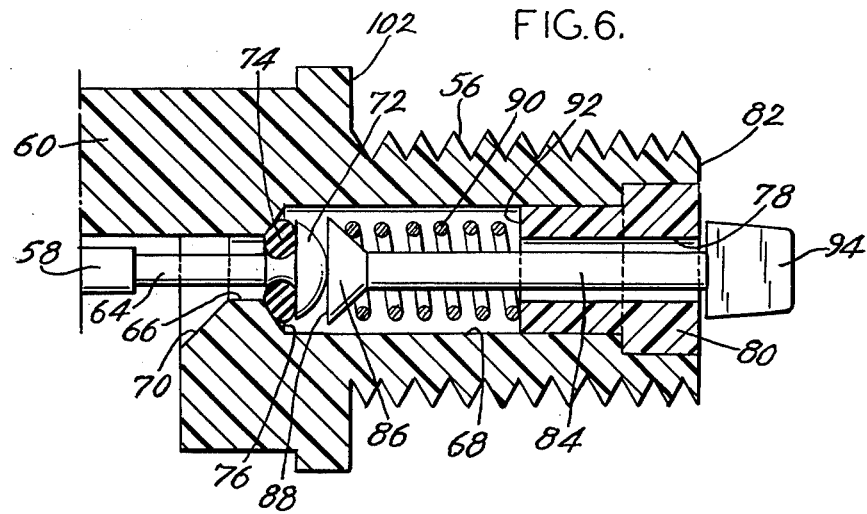
FIG. 6 is a fragmentary section of the valve, showing the details of the spring and guide assembly within the valve housing.

In FIGS. 5 and 6, a narrowed extension 64 of valve pin 58 is shown extending through discharge opening 66 of the valve housing into interior chamber 68. Opening 66 is provided with a conical bevel 70 on the outlet side to accommodate downward tilting of pin 58.

Extension 64 of pin 58 is provided at its end with a head 72 located within the interior of the housing. Head 72 retains a resilient annular sealing ring 74, made of rubber or a similar material. Sealing ring 74 cooperates with a conical seat 76, which is formed at the discharge end of interior chamber 68, and which symmetrically surrounds discharge opening 66.

The inlet opening of interior chamber 68 of the housing is provided by passage 78 within a removable guide sleeve 80. The guide sleeve has a stepped cylindrical configuration, and is press fit into the inlet end 82 of housing 56. An elongated pin 84 extends through passage 78, and is maintained by passage 78 substantially in alignment with valve pin 58 when the valve is in the closed condition, i.e. when pin 58 is horizontal. Passage 78 in guide sleeve 80 permits sliding movement of elongated pin 84 in the horizontal direction.

Pin 84 is preferably made from nylon or a similar high-strength thermoplastic material. Its end within housing interior 68 is in the form of a conical head 86 having a flat face 88 adapted to engage head 72 of valve pin 58. Head 72 is preferably formed so that those portions which can engage flat surface 88 of pin 84 are rounded, e.g. spherical. A coil spring 90, which is preferably made from stainless steel or a similar material not affected by water, is maintained in compression between conical head 86 of pin 84 and end 92 of guide sleeve 80. The spring, therefore urges face 88 of pin 84 into engagement with the rounded surface of head 72 of valve pin 58. The guide sleeve and the coil spring both serve to insure that pin 84 is centered and exerts a force on head 72 which is aligned with valve pin 58.

Pin 84 is flattened at its end opposite conical head 86 to provide an enlarged end portion 94, which facilitates assembly of the valve by preventing the inadvertent separation of pin 84 from guide sleeve 80 under the action of spring 90. Enlarged end portion 94 is located, as shown in FIG. 6, so that engagement between face 88 and head 72 is permitted.

Figure 7:
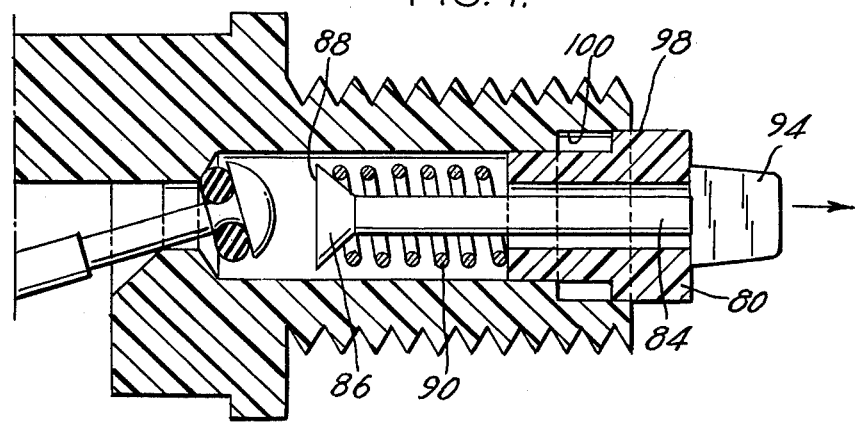
FIG. 7 is a fragmentary vertical section of the valve, illustrating the manner in which the spring and guide assembly are installed in and removed from the valve housing.

In FIG. 7, the assembly comprising guide sleeve 80, pin 84 and coil spring 90 is shown in a partially removed condition. For cleaning or for the occasional replacement of parts, this assembly is removable as a unit by manually pulling enlarged end portion 94. No adjustments are required when the assembly is installed in the valve housing.

The strength of spring 90 is not critical except that it cannot be so strong as to prevent the float from falling when the water level drops. In a typical valve, if the spring is designed to exert a force of the order of 30,000 dynes on the end of the valve stem it will prevent the seal from moving away from the valve seat without interfering with the operation of the float or materially reducing its sensitivity.

Referring to FIGS. 3 and 6, when the valve assembly is mounted in slot 48 in the watering trough, surface 102 (FIG. 6), which surrounds the valve housing, engages the inner side of wall 42 (FIG. 3). The valve assembly is secured in place by the nut 104 (FIG. 3) which is threaded onto the threads on the outer surface of the housing. Nut 104 is preferably a part of an integral nut and nipple combination, the nipple being adapted for connection of the valve to flexible conduit 22.

In the operation of the valve, with the float initially in the position shown in FIG. 3, a very slight lowering of the level of surface 52 of the water in the trough causes float 50 to drop. This in turn tilts pin 58 downwardly and causes the bottom portion of valve seal 74 (FIG. 6) to move away from seat 76, allowing water to flow through outlet opening 66 until valve pin 58 is restored to its orignal horizontal position. Since the spring assembly, including spring 90 and pin 84 acts only on the end of pin 58 at head 72, the spring does not materially interfere with the sensitivity of the float to variations in the water level. Providing head 72 of pin 58 with a spherical surface, acting against the flat surface 88 of pin 84 further insures against interference by spring 90 with the sensitivity of the float. As the sensitivity of the float is maintained, the water level in the trough is held within a very narrow range.

If the supply of water to overhead line 8 (FIG. 1) is shut off for any reason by the closure of valve 12, the reduction in pressure acting against head 72 of pin 58 (FIG. 6) does not allow seal 74 to move away from seat 76, as spring 90 exerts a closing force against head 72.

The spring does not interfere with flushing, which can be accomplished by removing cover 44 (FIG. 2) and moving float 50 manually in the direction toward the valve housing and thereby move seal 74 entirely away from seat 76.

While the principal advantage of the invention lies in the fact that it prevents leakage from the overhead line when the water supply is turned off without interfering with sensitivity of the float-controlled valve, there are a number of other advantages. Among them is the fact that the entire float-controlled valve assembly is small in size, yet structurally simple. As a consequence of its small size and structural simplicity, the valve assembly can be made economically.

Another important feature of the invention resides in the fact that the assembly consisting of the float, the valve pin and the valve seal is not rigidly constrained against longitudinal movement, and consequently, the valve can be flushed by a simple manual operation. At the same time, this assembly is not constrained against rotation around the axis of the valve pin. Nevertheless, seating of the valve is possible, since the valve seal is in the form of an O-ring, and the valve seat is frusto-conical in form and cooperates with the O-ring.

While the valve described has particular utility in poultry watering system, its utility is not necessarily limited to such systems; the valve can be used in any self-maintaining watering apparatus, including watering devices for small animals such as dogs, cats etc.

Although the particular embodiment described above is considered to represent the best mode of carrying out the invention, various modifications can be made to it. For example, the valve pin need not be horizontally disposed in its normal condition. Likewise, the spring may take various forms other than that specifically described, as may the pin corresponding to pin 84, the guide sleeve, and the valve housing itself. The water need not be supplied from an overhead line as shown; the improved valve is applicable to any system in which at least a portion of the supply conduit, between the manually controllable valve and the float-controlled valve, is located above the level at which water enters the trough through the float-controlled valve. These and various other modifications may be made without departing from the scope of the invention as defined in the following claims.

I claim:

1. In a watering system comprising means supplying water under pressure, at least one watering trough having float-controlled valve means for controlling the flow of water into said trough and maintaining a predetermined water level therein, conduit means for delivering water from said supplying means to said watering trough through said float-controlled valve means and controllable valve means for shutting off the flow of water in said conduit, in which at least a portion of said conduit in the length thereof between the controllable valve means and the trough is located above the level at which water enters the trough through said float-controlled valve means, and in which said float-controlled valve means comprises a housing having an inlet opening connected to receive water from said conduit, and a discharge opening arranged to discharge water into said trough, a valve seat surrounding said discharge opening on the upstream side thereof, a valve pin extending through said discharge opening into the interior of the housing and having an annular resilient valve seal disposed at its end on the upstream side of said discharge opening, said valve seal being arranged to cooperate with said valve seat to close off the flow of water through said discharge opening, and a float secured on the opposite end of said valve pin and adapted to rest on the surface of the water in said trough, the float, valve pin and valve seal being so arranged that, at a particular water level in the trough, the valve seal may be held against the valve seat by the pressure of water in said conduit so that the flow of water into the trough is cut off, the improvement comprising spring means located within said housing and acting on the end of the valve pin therein, said spring means continuously urging said valve seal in the direction toward said valve seat, and preventing said valve seal from moving away from said valve seat when the water in said trough is at said particular level, whereby water from said portion of the conduit located above the level at which water enters the trough is prevented from entering the trough when said controllable valve means is closed off and the water in said trough is at said particular level, and elongated pin means aligned with said valve pin when said valve seal is in its closed condition, and guide means supporting said elongated pin means for sliding movement in the longitudinal direction, said elongated pin means being engageable with the end of said valve pin when said valve seal is in its closed condition, and said spring means being arranged to urge said elongated pin means against said valve pin and in which said guide means is in the form of a sleeve supporting said elongated pin means for sliding movement in the longitudinal direction, said elongated pin means has a first enlarged end on one side of said sleeve, said first enlarged end being engageable with the end of said valve pin when said valve seal is in its closed condition, and a second enlarged end on the opposite side of said sleeve for preventing disengagement of said elongated pin means from said sleeve, said spring means is in the form of a coil spring surrounding said elongated pin and compressed between said first enlarged end and an end of said sleeve and arranged to urge said elongated pin means against said valve pin, the assembly comprising said elongated pin means, said guide means and said spring means forming part of the wall of said housing and being removable from said housing as a unit.

2. Apparatus according to claim 1 in which said housing has an opening for receiving said sleeve, and said sleeve is press fit in said opening for receiving said sleeve.

* * * * *